F. N. MASON.
PACKING.
APPLICATION FILED FEB. 16, 1920.

1,404,780.

Patented Jan. 31, 1922.

Frank N. Mason
INVENTOR by Winter & Brown
his Attorneys

WITNESS

Jos. Baily Brown

UNITED STATES PATENT OFFICE.

FRANK N. MASON, OF PITTSBURGH, PENNSYLVANIA, ASSIGNOR TO MASON PACKING COMPANY, OF PITTSBURGH, PENNSYLVANIA, A CORPORATION OF PENNSYLVANIA.

PACKING.

1,404,780.   Specification of Letters Patent.   Patented Jan. 31, 1922.

Application filed February 16, 1920. Serial No. 359,164.

*To all whom it may concern:*

Be it known that I, FRANK N. MASON, a resident of Pittsburgh, in the county of Allegheny and State of Pennsylvania, have invented a new and useful Improvement in Packing, of which the following is a specification.

This invention relates to packing designed to make a fluid-tight non-leakable joint about a movable rod. It relates particularly to a special packing for such purposes, formed usually of a metallic bearing portion, and a surrounding non-metallic packing member, the bearing member being conical on its exterior surface, and the packing member being adapted to fit around the bearing member and to be relative thereto, in a casing, under pressure. Such a packing is illustrated and described in my co-pending application Serial #339,110, filed November 19, 1919.

The object of the present invention is to provide means to retard, by offering resistance to forward travel, the movement of the resilient packing element about the tapered bearing element, in a packing construction, such as that described in my co-pending application.

Figure 1:
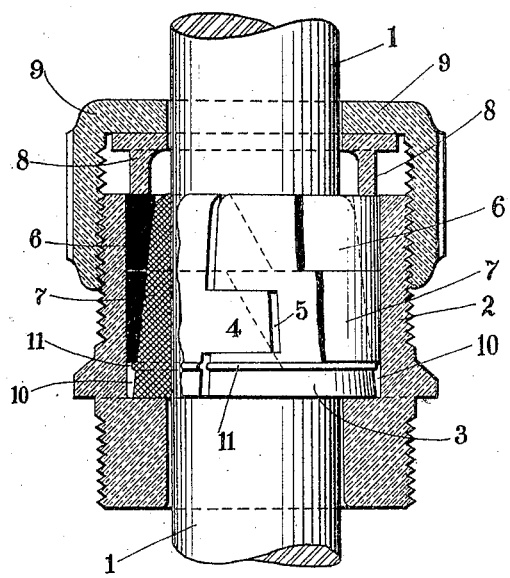
Figure 3:
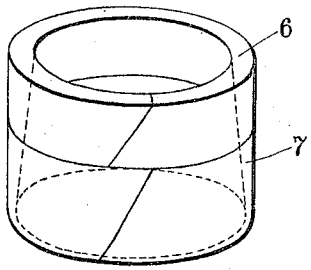
Figure 2:
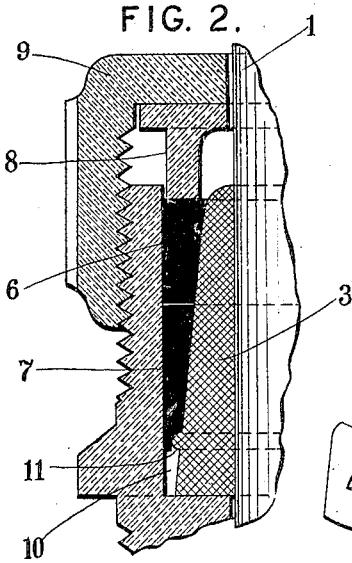
Figure 4:
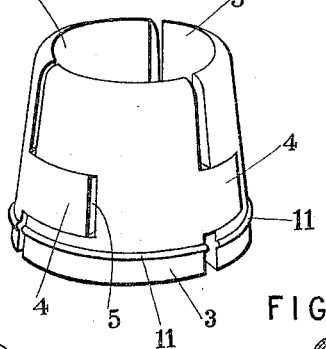
Figure 5:
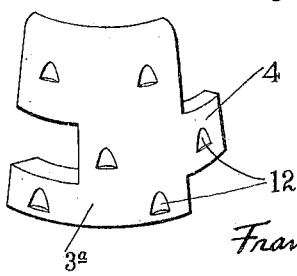
Figure 6:
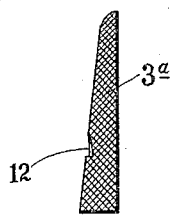

Referring to the drawings, Fig. 1 is a longitudinal section of a stuffing box showing this inventon used in a packing applied to a piston rod; Fig. 2 is an enlarged partial section similar to that of Fig. 1, except that the packing member has been driven forward somewhat; Fig. 3 is a perspective view of the non-metallic portion of the entire packing; Fig. 4 is a perspective view of the bearing segments; Fig. 5 is a perspective view of a modified bearing segment; and Fig. 6 is a sectional view of the segment shown in Fig. 5.

The packing as illustrated surrounds a piston rod 1 and is carried in a casing 2, adapted to screw into the end of a cylinder head, or other mounting, as will be obvious. The packing comprises two or more bearing segments 3, each of which has a lateral tongue 4, and a corresponding recess 5, in its other side. When the segments are placed in cooperative position, as shown in Fig. 4, the tongues and grooves interfit and break joints between the segments, and so prevent the escape of fluid therebetween. The interior faces of segment 3 are cylindrical, adapted to fit closely around a piston rod. The exteriors of the segments are tapered from end to end, as shown clearly in Figs. 1 and 4.

A non-metallic packing member having a tapered interior is adapted to fit around the segments 3, as shown in Figs. 1 and 2. This member is illustrated as composed of two split rings 6 and 7, but obviously it may be made of one or more rings. This packing ring is tapered on the inside and is of such thickness that it just fits into the space between the outer wall of the bearing member 3 and the inner wall of the casing 2, and is somewhat shorter than the segments 3 so as to permit additional travel, as the bearing segments wear thin, and the packing ring is forced down thereon. The packing rings are made of some dense non-metallic material, as for example asbestos or rubber composition, fiber, etc. Such material is hard and not easily distorted by pressure, while at the same time it has more resiliency than metal, and exerts a resilient pressure on the exterior of the bearing segments. The latter members are made of any suitable anti-friction bearing material, such as Babbitt metal, bakelite composition, etc. Ordinarily however they will be made of metal, such as lead, Babbitt metal, etc.

A gland ring 8 is adapted to drive the wedge-shaped packing around the bearing segments when the cap 9 is screwed down, or when pressure is exerted thereon by any suitable means. This can be done in a variety of ways, as by bolts through the cap 9.

When the packing member is driven under pressure of the gland ring into the tapered circular recess around the bearing segments, it has a wedge like function, pressing the latter members against the piston rod, and therefore insuring a fluid-tight close fitting bearing at all times. At the same time the outer wall of the packing fits tightly against the casing, thus preventing escape of fluid between the casing and packing. As the bearing segments wear down they move closer together, and an occasional turning down of the cap 9 with the consequent driving of the resilient wedge-shaped packing member into the space around the bearing members, insures a constant pressure thereon, and consequently a fluid-tight bearing, even under the hardest conditions, such as in air pump cylinders, etc.

It will be observed that the packing member does not normally extend throughout the space between the segments 3 and the casing wall 2, but that an open portion 10 is left beyond the thinner end. This permits further travel of the packing ring as the bearing segments wear down. Thus there is a constant compensation for the wear of the bearing segments by the forward travel of the wedge-shaped packing member therearound. This travel is caused by pressure of the gland ring 8, from an occasional turning down of the cap 9 thereagainst. The tapered packing is thus driven around the bearing segments, and the oppositely disposed tapered bearing and packing members are automatically kept in their normal close fitting relation. The space 10 permits a considerable amount of such take up, and this space may be varied somewhat in different forms of packing, to meet different conditions.

In order to secure a desirable amount of resistance to the forward travel of the packing member, some form of retarding element is provided to engage the surface thereof. In Figs. 1, 2 and 4 this is shown as a small bead 11, applied near the lower ends of the bearing segments 3, and extending therearound. In Figs. 5 and 6 instead of the bead 11 small depressions 12, as illustrated, are provided over the outer surface of the bearing segments.

The retarding means may be varied, and have a number of different forms. For example the bead 11 may be cut away in certain portions, resulting in a number of projections adapted to engage a resilient packing member. Or, instead of a bead 11, a similarly placed groove may be employed. The essential thing is to provide means to engage the packing member as it moves forward under pressure, and to offer resistance to its forward travel.

The effect of this retarding means, in whatever form, is to offer additional resistance to the driving of the tapered packing member around the bearing segments. This retarding element is highly important in cases where a light fluid, such as air or steam, under high pressure, is retained by the packing. In such cases, the packing, being under considerable pressure, tends to flow, or move, too freely, into the reserve space 10 around the bearing segments, and it is advantageous to provide the means herein disclosed, to retard it, and so to prevent passage thereof through the space 10, until the bearing segments have actually worn down, and to have forward travel of the packing only in compensation for such wear.

The advantages of this invention will be apparent to those familiar with packings, of the nature set forth.

I claim:

1. In a packing for moving members comprising a casing surrounding the member, a tapered bearing element in the casing and around the moving member, a tapered packing member adapted to fit around the bearing member and to travel forward in relation thereto, means to drive the packing member into a free space normally provided around the bearing member at the forward end of the packing member, and means adapted to engage the packing member to oppose its forward travel around the bearing member.

2. A packing for a moving shaft, comprising interfitting segments adapted to form a bearing for the shaft, said segments having tapered exteriors, a packing ring tapered on its inner surface to conform to the exterior of the bearing member, said packing ring being shorter than the bearing segments thereby forming a free space at the forward end thereof, a casing around the packing ring, means to exert pressure on the packing ring to drive it around the bearing segments, and means on the segments to resist the forward travel of the packing ring around the bearing segments into said free space.

3. A packing for a shaft comprising interfitting segments adapted to form a bearing, said segments having tapered exteriors, a packing ring tapered on its inner bore to conform to the exterior of the bearing segments, a casing around the packing ring, means to exert pressure on the packing ring to drive it around the bearing segments, and a bead adapted to engage the forward end of the packing ring to offer resistance to its forward travel into a free space provided beyond said bead.

4. A packing for a shaft comprising interfitting segments adapted to form a bearing, said segments having tapered exteriors, a packing ring tapered on its inner bore to conform to the exterior of the bearing segments, a casing around the packing rings, means to exert pressure on the packing ring to drive it into the casing around the bearing segments, and a bead on the exterior of the bearing segments adapted to engage the forward end of the packing member and offer resistance to its forward travel into a free space beyond said bead.

5. A packing for a shaft comprising interfitting segments adapted to form a bearing, said segments having tapered exteriors, a packing ring tapered on its inner bore to conform to the exterior of the bearing segments, a casing around the packing rings, means to exert pressure on the packing ring to drive it into the casing around the bearing segments, and retarding devices on the surface of the bearing members adapted to engage the packing member and offer resistance to its forward travel into a free space normally provided beyond said forward end.

In testimony whereof, I have hereunto set my hand.

FRANK N. MASON.

Witnesses:
HOWARD L. SNIVELY,
ALICE A. TRILL.